United States Patent
Maas (10) Patent No.: US 7,154,082 B2
(45) Date of Patent: Dec. 26, 2006

(54) FREQUENCY DIVISION AND/OR WAVELENGTH DIVISION MULTIPLEXED RECURSIVE FIBER OPTIC TELEMETRY SCHEME FOR AN OPTICAL SENSOR ARRAY

(75) Inventor: Steven J. Maas, Austin, TX (US)

(73) Assignee: PGS Americas, Inc., Houston, TX (US)

( * ) Notice: Subject to any disclaimer, the term of this patent is extended or adjusted under 35 U.S.C. 154(b) by 243 days.

(21) Appl. No.: 10/922,591

(22) Filed: Aug. 20, 2004

(65) Prior Publication Data

US 2006/0038115 A1 Feb. 23, 2006

(51) Int. Cl.
*G01J 4/00* (2006.01)

(52) U.S. Cl. .................... 250/227.18; 385/13
(58) Field of Classification Search .......... 250/227.18; 356/519; 385/1, 3
See application file for complete search history.

(56) References Cited

U.S. PATENT DOCUMENTS

| | | | | |
|---|---|---|---|---|
| 4,525,818 A | * | 6/1985 | Cielo et al. ................. 367/149 |
| 4,770,535 A | * | 9/1988 | Kim et al. ................... 356/478 |
| 4,929,050 A | * | 5/1990 | Wilson .................. 250/227.17 |
| 5,140,154 A | * | 8/1992 | Yurek et al. ............ 250/227.12 |
| 5,206,924 A | * | 4/1993 | Kersey ........................ 385/24 |
| 5,345,522 A | * | 9/1994 | Vali et al. ..................... 385/24 |
| 5,748,312 A | * | 5/1998 | Kersey et al. ............... 356/478 |
| 5,867,258 A | * | 2/1999 | Frederick et al. .......... 356/35.5 |
| 5,987,197 A | * | 11/1999 | Kersey ........................ 385/24 |
| 6,208,440 B1 | * | 3/2001 | Jang ............................. 398/9 |
| 6,285,806 B1 | * | 9/2001 | Kersey et al. ................ 385/12 |
| 6,549,701 B1 | * | 4/2003 | Baney et al. ................ 385/27 |
| 6,680,472 B1 | * | 1/2004 | Thingbø et al. ....... 250/227.12 |

* cited by examiner

*Primary Examiner*—Georgia Epps
*Assistant Examiner*—Kevin Wyatt
(74) *Attorney, Agent, or Firm*—E. Eugene Thigpen; Richard A. Fagin (57) ABSTRACT

An optical fiber sensor array is disclosed which includes a first sensor fiber and a first reference fiber coupled at one end thereof to one side of a first optical coupling. A first wavelength selective reflector is coupled to the other end of each of the first sensor fiber and the first reference fiber. A second sensor fiber is coupled at one end to one side of a second optical coupling. The other side of the second optical coupling is coupled to an opposite side of one of the first wavelength selective reflectors coupled on one side to the first sensor fiber and the first reference fiber. The array also includes a second wavelength selective reflector coupled to the other end of each of the second sensor fiber and the second reference fiber. The second wavelength selective reflectors are operative at a wavelength different from an operative wavelength of the first wavelength selective reflectors.

40 Claims, 5 Drawing Sheets

FREQUENCY DIVISION AND/OR WAVELENGTH DIVISION MULTIPLEXED RECURSIVE FIBER OPTIC TELEMETRY SCHEME FOR AN OPTICAL SENSOR ARRAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of fiber optic telemetry systems and fiber optic sensor systems. More specifically, the invention relates to wavelength division multiplex telemetry systems for an array of fiber optic sensors.

2. Background Art

Fiber optic sensors known in the art include an optical fiber sensing element, typically in the form of a coil of optical fiber, that is arranged such that the length and/or the refractive index of the optical fiber sensing element is changed by the action of the physical parameter being measured by the sensor. For example, a fiber optic acoustic sensor has a fiber sensing coil wound around a cylinder, the shape of which changes by the action of a pressure wave, or an acoustic wave, impinging on the cylinder. Deformation of the cylinder changes the length of the sensing coil. Light from a source such as a laser diode is passed through the sensing coil and is simultaneously passed through a "reference" element or coil of optical fiber. The reference element is arranged so that it is not physically affected by the physical parameter being measured. Light exiting both the sensing element and the reference element are then combined in any one of a number of types of optical interferometer. An optical interference pattern is generated in the interferometer which is related to the change in length of the sensing element (and thus the phase of the light passing through the sensing element). A photodetector is optically coupled to the output of the interferometer, and may be used to generate an electrical signal that corresponds to the intensity of light reaching the photodetector (which is related to the interference pattern), and thus corresponds to the physical parameter affecting the sensing element. In the case of a fiber optic acoustic sensor, the electrical signal from the photodetector corresponds to the change in pressure, or to the amplitude of the acoustic wave, impinging on the sensing coil.

Fiber optic sensors have proven very useful because of their relative immunity from electromagnetic interference, among other factors, particularly when signals are transmitted over long distances in optical form. Because of the relative advantages of fiber optic sensors, efforts have been made to substitute fiber optic sensors in applications such as marine seismic sensor arrays. Conventional marine seismic sensor arrays known in the art typically include a plurality of electrical-signal generating acoustic sensors, typically magnetostrictive or piezoelectric hydrophones, disposed at spaced apart locations along a reinforced cable adapted to be towed in a body of water. Typically, such a seismic sensor array includes various signal processing devices disposed at selected locations along the cable which detect, amplify, and digitize the electrical signals generated by each of the sensors. The digitized signals are included in electrical signal telemetry in order to transmit signals from each one of the sensors in such a way that the signal from each sensor can be uniquely identified, recorded and processed. Electrical telemetry systems known in the art are intended to minimize the number of electrical conductors needed to transmit signals from a selected number of sensors, and to minimize signal distortion between the sensors and a recording device. It is also known in the art to convert the digitized electrical signals into optical signals and use optical telemetry to transmit the optical signals from the electrical/optical conversion point to an optical signal receiver.

Optical sensing and signal telemetry are desirable to use in marine seismic sensor systems because, as previously explained, they are less susceptible to various forms of interference and signal loss along the cable. In order to more effectively substitute optical sensors for electrical sensors in a marine seismic sensor array, it is desirable to have an entirely optical telemetry system to transmit signals from each optical sensor to a seismic signal recording system. The telemetry system must enable unique identification and recording of the signals from each individual optical seismic sensor. One type of fiber optic sensor array and an optical telemetry system are disclosed in U.S. Pat. No. 6,285,806 B1 issued to Kersey et al . . . The sensor array disclosed in the Kersey et al. patent includes a plurality of fiber sensing coils optically coupled in series along an optical signal line. Each fiber sensor coil is followed along the signal line by a fiber Bragg grating adapted to reflect a portion of the light passing through it back through the optical signal line. Light from a source, such as a laser diode, is modulated into a pseudo-random binary (or bit) sequence (PBRS) and is coupled into the signal line. A code generator which produces the PBRS is also coupled to a time delay circuit. The signal line is also coupled to a photodetector. Groups of the sensors are interrogated by correlation of the light reflected back along the signal line by the Bragg gratings to the modulated input light. Correlation is performed with respect to the time delay added by the delay circuit. The time delay is specifically selected to interrogate length-wise segments of the signal line from the light input end to a selected endpoint at one of the sensing coils. The correlated signal includes the effects of all the sensors from the light input end to the selected endpoint. Individual sensor signals may be determined by subtraction of correlated signals representing different selected lengths of the signal line. A purported advantage of the array disclosed in the Kersey et al. '806 patent is that no optical couplings are needed between the individual sensors and the signal line, with attendant losses of light amplitude. The system disclosed in the Kersey et al. patent is specifically adapted to operate on a single wavelength of light.

Another type of sensor array is disclosed in U.S. Pat. No. 5,206,924 issued to Kersey, which includes a light source coupled to a polarization beam splitter. One output of the polarization beam splitter is coupled to one or more fiber optic sensors along a sensor line. The individual sensors are coupled to the sensor line in series, and each sensor is followed in series by an optical delay line. Each of the sensors includes a reference coil and a sensing coil. The input ends of each sensing coil and each reference coil are optically coupled to the signal line through an optical coupler. The output ends of each sensing coil and each reference coil are terminated in a Faraday rotator and a mirror. When light passes through the Faraday rotator, its polarization state is rotated 45 degrees. In the sensors of the array disclosed in the Kersey '924 patent, the mirror at each coil termination returns the light back through the same Faraday rotator, again rotating the polarization state by 45 degrees. Light returns back through the sensor coil and the reference coil having polarization states rotated by a total of 90 degrees before the light is returned to the sensor line through the optical coupling. The optical coupling performs the function of an interferometer. Interference patterns from the optical couplings along the sensor line are transmitted back to a photodetector coupled to one input of the polarization beam splitter. Individual sensors are interrogated by appropriate pulsing of the input light to create a time division telemetry scheme. A purported advantage of the array show in the Kersey '924 patent is substantial elimination of polarization fading along the signal line, without the need for expensive, high-birefringence "polarization preserving" fibers.

Yet another optical sensing system is disclosed in U.S. Pat. No. 5,140,154 issued to Yurek et al. The system disclosed in the '154 patent includes an inline fiber optic acoustic sensor array. The array includes first and second fiber optic sensor units for sensing a desired property. The first and second sensor units are connected in a linear array, such that each sensor unit incorporates a complete functional sensor, and the two sensor units are separated from each other by an intermediate delay element responsive both to the desired property being measured and to environmental stress connected between the first and second sensors for providing time separation between signals corresponding to the desired measured property produced by the first and second sensor units, and signals produced by the array in response to environmental stress impinging on the delay element. Each fiber optic sensor produces a modulated coherent light beam in response to an impinging desired measured physical property. The delay element produces a modulated coherent light beam in response to both an impinging desired measured property and environmental stresses. Modulated coherent light beams produced by each fiber optic sensor are time separated from modulated coherent light beams produced by the adjacent delay element. Conventional time discriminating signal processing techniques are used to interrogate only the sensor units, or to otherwise eliminate electrical signals corresponding to the modulated coherent light beam produced by the delay element, thus decoupling environmental stresses from the electrical signals being processed.

There continues to be a need to improve isolation of individual sensor signals in a fiber optic sensor array, to improve the amplitude and fidelity of the sensor signals returned to a recording unit, and to minimize the number of optical fibers needed in any particular fiber optic sensor array.

SUMMARY OF THE INVENTION

One aspect of the invention is optical sensor array. An optical sensor array according to this aspect of the invention includes a first optical sensor having a first sensing fiber and a first wavelength selective reflector at one end of the first sensing fiber. The other end of the first sensing fiber is coupled to an optical signal line. The array includes a second optical sensor having a second sensing fiber and a second wavelength selective reflector at one end of the second sensing fiber. The other end of the second sensing fiber coupled to the optical signal line. The first and second wavelength selective reflectors operate at different light wavelengths from each other.

Another aspect of the invention is an optical fiber sensor array. An optical fiber sensor array according to this aspect of the invention includes a first sensor fiber and a first reference fiber coupled at one end thereof to one side of a first optical coupling. A first wavelength selective reflector is coupled to the other end of each of the first sensor fiber and the first reference fiber. A second sensor fiber is coupled at one end to one side of a second optical coupling. The other side of the second optical coupling is coupled to an opposite side of one of the first wavelength selective reflectors coupled on one side to the first sensor fiber and the first reference fiber. The array also includes a second wavelength selective reflector coupled to the other end of each of the second sensor fiber and the second reference fiber. The second wavelength selective reflectors are operative at a wavelength different from an operative wavelength of the first wavelength selective reflectors.

Another aspect of the invention is a marine seismic sensor system, including a seismic vessel adapted to tow at least one streamer. The system includes at least one seismic streamer coupled to the vessel. The at least one streamer includes at least one sensor array thereon. The at least one sensor array includes a first sensor fiber and a first reference fiber coupled at one end thereof to one side of a first optical coupling. The at least one sensor array further includes a first wavelength selective reflector coupled to the other end of each of the first sensor fiber and the first reference fiber. The at least one sensor array also includes a second sensor fiber coupled at one end to one side of a second optical coupling. The other side of the second optical coupling is coupled to an opposite side of one of the first wavelength selective reflectors coupled on one side to the first sensor fiber and the first reference fiber. The at least one sensor array also includes a second wavelength selective reflector coupled to the other end of each of the second sensor fiber and the second reference fiber. The second wavelength selective reflectors are operative at a wavelength different from an operative wavelength of the first wavelength selective reflectors.

Other aspects and advantages of the invention will be apparent from the following description and the appended claims.

DETAILED DESCRIPTION

Figure 1:
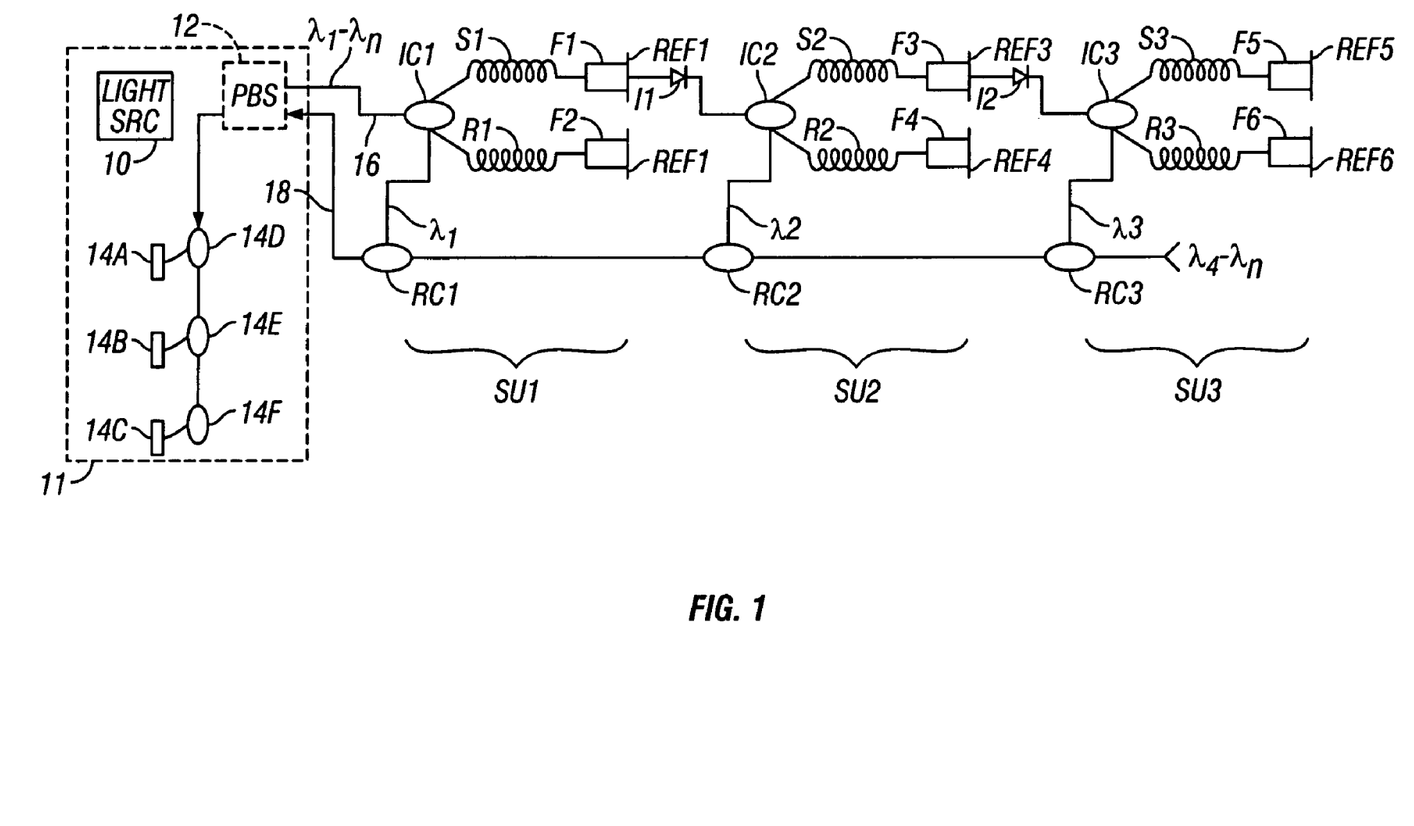
FIG. 1 shows an example embodiment of a sensor array according to the invention.

One embodiment of a fiber optic sensor array and telemetry system is shown schematically in FIG. 1. The system includes a light source/detector module 11. The module 11 includes a light source 10 which may be a plurality of laser diodes, or other type of light source capable of emitting light at a plurality of individual wavelengths $\lambda_1$–$\lambda_n$ for combined output to a light source line 16. The light source line 16 connects to one input of a first optical coupling IC1. The first optical coupling IC1 is a conventional optical coupling including two input terminals, and in this embodiment may include a 10 percent output terminal and a 90 percent output terminal.

In the present embodiment, the 90 percent output terminal may be coupled to one end of a first sensor fiber S1. The first sensor fiber S1 may be in the form of a coil, and in some implementations may be an acoustic or seismic sensing coil. The 10 percent output terminal may be coupled to a reference fiber R1, which also may be in the form of a coil. Alternatively, the 10 percent output may be coupled to a different sensing fiber that is arranged to conduct light in the opposite direction, or operates in conjunction with the first sensor fiber S1 in a so-called "push-pull" arrangement. The other end of the first sensor fiber S1 is terminated in a first wavelength selective reflector REF1. The first wavelength selective reflector REF1 is adapted to reflect light at a first selected wavelength $\lambda_1$, and to pass light at other wavelengths. Examples of a wavelength selective reflector are Bragg gratings and thin film filter/mirrors. Other types of wavelength selective reflectors are known in the art, and include, for example, wavelength selective mirrors. In one embodiment the wavelength selective reflector REF1 can be a wavelength selective Faraday rotator mirror (that may be made from a Faraday rotator coupled to a mirror or as a single element), which is used to reduce or substantially eliminate polarization fading in the interferometer. In some embodiments, to reduce polarization noises/losses, a polarization beam splitter 12 may be interposed between the source 10 and the source line 16. If the polarization beam splitter 12 is used, only one polarization state output is typically coupled to the source line 16.

The other end of the first reference fiber R1 is terminated in a second wavelength selective reflector REF2. The second wavelength selective reflector REF2 operates at substantially the same wavelength, $\lambda_1$, as the first wavelength selective reflector REF1. Light at the selected wavelength, $\lambda_1$, which is reflected by the first and second wavelength selective reflectors REF1, REF2 is passed back through the first sensing fiber S1 and first reference fiber R1, respectively, to the first optical coupling IC1. The first optical coupling acts as an interferometer for the light returning through the first sensing fiber S1 and first reference fiber R1. Light returning through the first optical coupling IC1 is attenuated in amounts opposite to the attenuations of light passing through the first optical coupling in a direction away from the light source 10. Thus, light amplitude of the reflected light is substantially balanced between light reflected back through the first sensor fiber S1 and the first reference fiber R1.

Reflected light which exists second input terminal of the first optical coupling IC1 may be multiplexed, such as through a return optical coupling RC1, into a signal return line 18. An interference pattern generated in the first optical coupling IC1 corresponds to a physical signal impinging on the first sensor fiber S1. The first reference fiber R1 remains substantially unaffected by the physical signal. The physical signal is related to the property or parameter being measured by the sensors on the array. In the present embodiment, the first sensing fiber S1, the first reference fiber R1, their respective wavelength selective reflectors REF1, REF2, and the first optical coupling IC1, form a first optical sensor SU1. In the present embodiment, the fibers S1, R1 may be arranged such that the first sensor SU1 is a fiber optic hydrophone. The first optical sensor SU1 returns to the return line 18 an interference pattern at the first selected light wavelength $\lambda_1$.

The side of the first wavelength selective reflector REF1 opposite to the side coupled to the first sensing fiber S1 is coupled to the light input of a second, similarly configured optical sensor SU2. The second optical sensor SU2 includes a sensing fiber or coil S2, a reference fiber or coil R2 and an optical coupling IC2 similar in configuration to those of the first sensor SU1. What are different in the second sensor SU2 are third REF3 and fourth REF4 wavelength selective reflectors coupled to the other ends of the coils S2, R2, respectively. The third REF3 and fourth REF4 wavelength selective reflective reflectors each reflect light at a second, different wavelength, $\lambda_2$, than the first and second wavelength selective reflectors REF1, REF2, respectively. Thus, the output of the second sensor SU2, which may be multiplexed to the return line 18 by a second return coupling RC2, includes an interference pattern of light at the second wavelength, and which corresponds to signals detected by the second sensing coil S2. Light reflected by the wavelength selective reflectors REF3, REF4 in the second sensor SU2 may be multiplexed into the return line 18 by a second return coupling RC2.

The opposite side of the third wavelength selective reflector REF3 may be coupled to the input, at coupling IC3, of a third optical sensor SU3, in a manner similar to the input, at coupling IC2, of the second sensor SU2 being coupled to the opposite side of the first wavelength selective reflector REF1. The third sensor SU3 includes a sensor coil S3, reference coil R3 and wavelength selective reflectors REF5, REF6 that reflect light at a third wavelength $\lambda_3$. Similar, additional sensors (not shown in FIG. 1) may be included, each internally reflecting a different wavelength $\lambda_4$–$\lambda_n$, and multiplexing an interference pattern onto the return line 18 by an associated return coupling (not shown).

In some embodiments, an optical isolator I1, I2, may be interposed between the light source output (the other side of the wavelength selective reflector REF1, REF2, REF3 coupled to each sensor coil S1, S2, S3) of each sensor coil and the light input of the following optical sensor to prevent any downstream reflected light from entering the upstream optical sensor.

The embodiment shown in FIG. 1 includes the 90 percent output of each optical coupling connected IC1, IC2, IC3 to the corresponding sensor fiber S1, S2, S3, and the output end of each corresponding wavelength selective reflector REF1, REF3, REF5 is coupled to the input of the succeeding optical coupling. The 10 percent output terminal of each optical coupling IC1, IC2, IC3 is coupled to the corresponding reference fiber R1, R2, R3. It should be understood that an array according to the invention will also work if the light output terminals of each optical coupling IC1, IC2, IC3 were reversed, and the succeeding input of each optical coupling were coupled to the wavelength selective reflectors REF2, REF4, REF6 on the downstream side of each reference fiber R1, R2, R3.

The signal return line 18 may be coupled, through wavelength selective couplings 14D, 14E, 14E, or filters, to a photodetectors 14A, 14B, 14C. Each photodetector generates an electrical signal corresponding to the light amplitude at one of the wavelengths $\lambda_1$–$\lambda_n$ and thus to the physical parameter being measured by each sensor SU1, SU2, SU3.

In some embodiments, a first Faraday rotator F1, F3, F5 may be interposed between the other end of each sensor fiber S1, S2, S3 and the corresponding wavelength selective reflector REF1, REF2, REF3. A similar Faraday rotator F2, F4, F6 may be coupled as shown in FIG. 1 to the output end of each reference fiber R1, R2, R3. In such embodiments, the Faraday rotator preferably rotates the polarization state of light by about 45 degrees, such that light returning to the respective fibers, S1–S3, R1–R3 has polarization substantially orthogonal to the light entering each fiber. In such embodiments, the signal return line 18 may be coupled to the output terminal of the polarization beam splitter 12 that is orthogonal to the output terminal coupled to the input line 16. The second input of the polarization beam splitter 12 can be coupled, through wavelength selective couplings 14D, 14E, 14F, or filters, to a corresponding photodetector 14A, 14B, 14C. Each photodetector generates an electrical signal corresponding to the light amplitude at one of the wavelengths $\lambda_1$–$\lambda_n$ and thus to the physical parameter being measured by each sensor SU1, SU2, SU3. A possible advantage of using Faraday rotators mirrors as the reflecting elements is to substantially eliminate polarization fading in the sensor unit SU1–SU3 and return line 18. Such advantages are explained in U.S. Pat. No. 5,206,924 issued to Kersey, which is incorporated herein by reference. A sensor array made as explained with reference to FIG. 1 may be used in a number of sensor array applications. One such application is seismic sensing, as will be explained with reference to FIG. 2. Another possible application is permanently emplaced sensors in a wellbore drilled through Earth formations.

Figure 2:
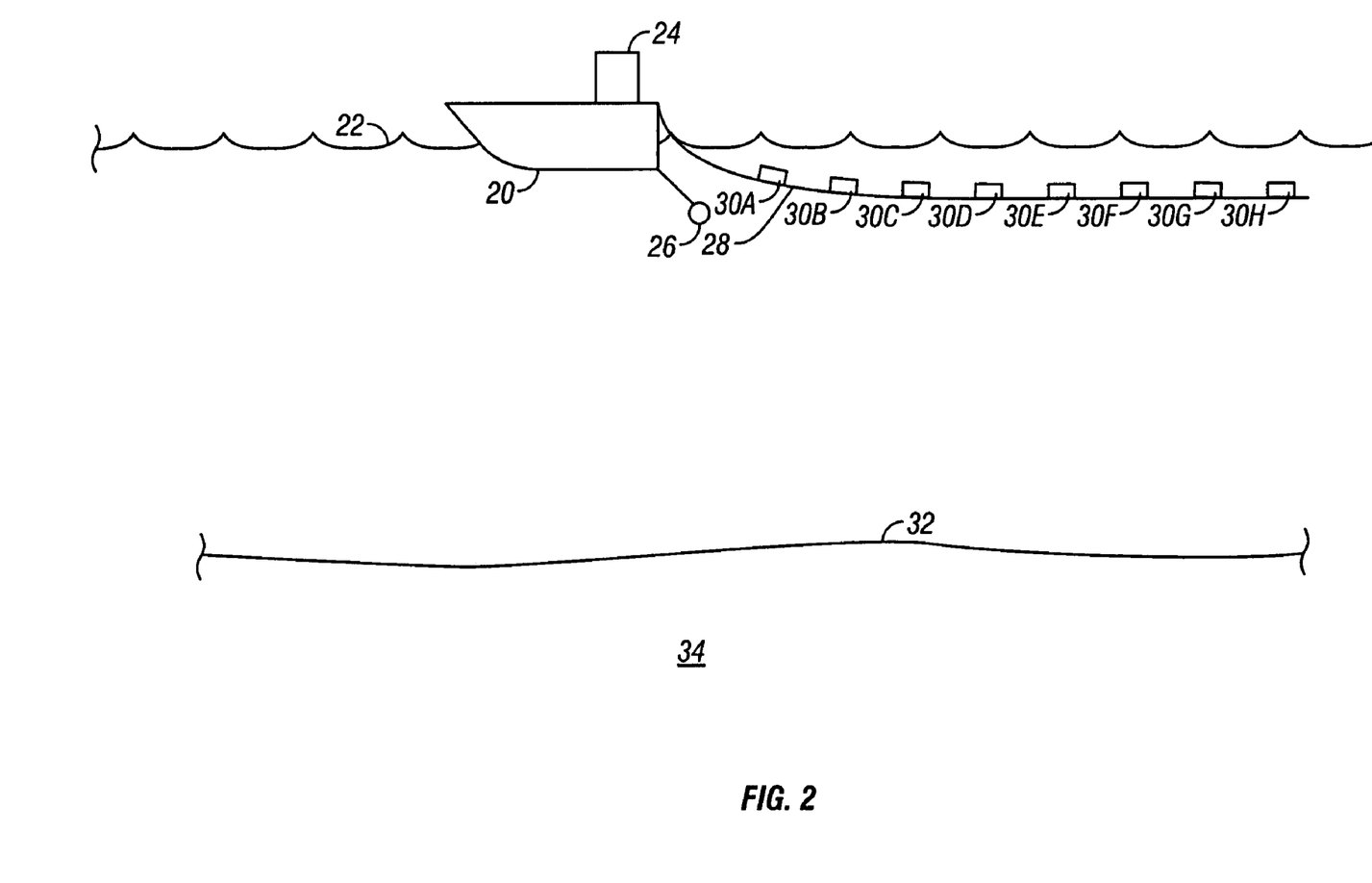
FIG. 2 shows a marine seismic acquisition system using sensors according to the invention.

One embodiment of a marine seismic acquisition system using a sensor array according to the invention is shown in FIG. 2. The system includes a seismic vessel 20 adapted to tow one or more seismic streamers 28 in a body of water 22. The streamer is a reinforced cable adapted to be towed through the water 22, and may include one or more optical fibers (not shown) and one or more electrical conductors (not shown). The vessel 20, or another vessel (not shown) may tow a seismic energy source 26, which may be an air gun, or array of such guns. The seismic vessel 20 may include a recording system 24 which includes navigation equipment for determining the geographic position of the vessel 20 and each one of the source 26 and a plurality of seismic sensors 30A–30D on the one or more streamers 28. The recording system may include a device for detecting and recording signals generated by each of the sensors 30A–30H, indexed with respect to time of actuation of the source 26. The vessel 20 may include, within the recording system 24, a source controller for precisely timing actuation of the source.

The sensors 30A–30H may be configured substantially as shown and as explained with reference to FIG. 1, wherein each sensor 30A–30H includes wavelength selective reflectors operative at a different wavelength. The number of sensors shown in FIG. 2 is only meant to illustrate the general configuration of a seismic sensor array and is not intended to limit the scope of the invention.

In operation, the source 26 is periodically actuated, and seismic energy travels generally outwardly from the source. The seismic energy penetrates the water bottom 32, until it is reflected at one or more acoustic impedance boundaries (not shown) in the subsurface 34. Reflected seismic energy is detected by the sensors 30A–30H. Signals corresponding to the detected seismic energy may be processed according to any one of many methods well known in the art.

Figure 3:
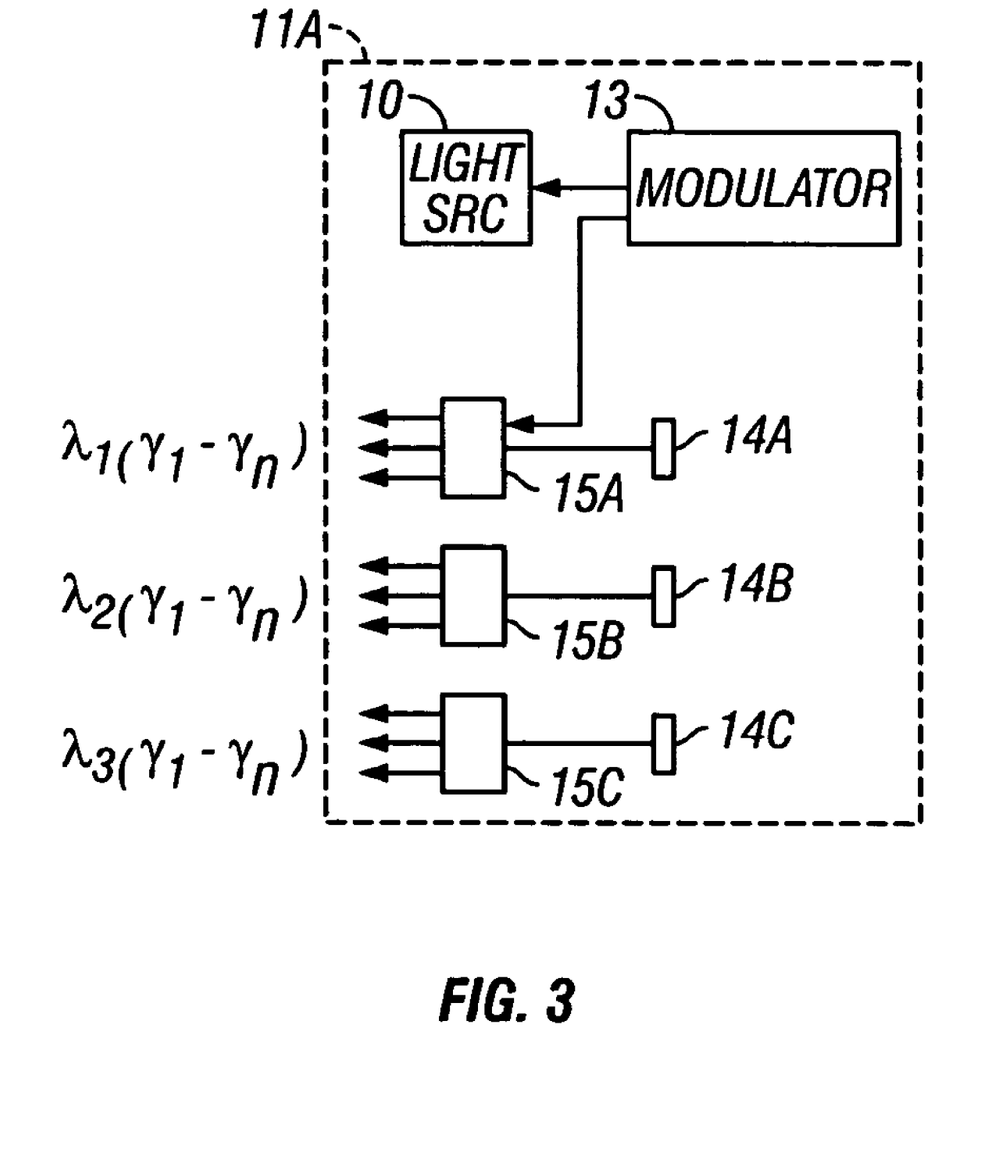
FIG. 3 shows an alternative embodiment of a light source/detector module in more detail.

FIG. 3 shows an alternative embodiment of the light source/detector module 11A which includes frequency division multiplexing for enabling the interrogation of more individual sensors using the same number of source lines and signal return lines. The module 11A includes the same type of light source 10 as in the previous embodiment, namely a plurality of laser diodes or similar source which impart combined individual wavelengths of light to the source line (16 in FIG. 1). In the present embodiment, the light output of the source 10 is modified by a modulator 13. Modulation includes varying the light output according to a selected frequency and waveform. A suitable modulation technique is disclosed in U.S. Pat. No. 4,648,083 issued to Giallorenzi and incorporated herein by reference. Such modulation techniques are referred to as "frequency division multiplexing." A signal generator (not shown separately) forms part of the modulator 13 and also drives a demodulator 15A, 15B, 15C coupled to the electrical output of each of the photodetectors 14A, 14B, 14C. The photodetectors 14A, 14B, 14C are substantially as explained with reference to FIG. 1 and provide a signal output for each wavelength $\lambda_1$–$\lambda_n$. The demodulator provides a separate signal output for each modulation frequency $\gamma_1$–$\gamma_n$. A system having a light source/detector module as shown in FIG. 3 can interrogate as many individual sensors as the product of the number of frequencies and the number of wavelengths.

Figure 4:
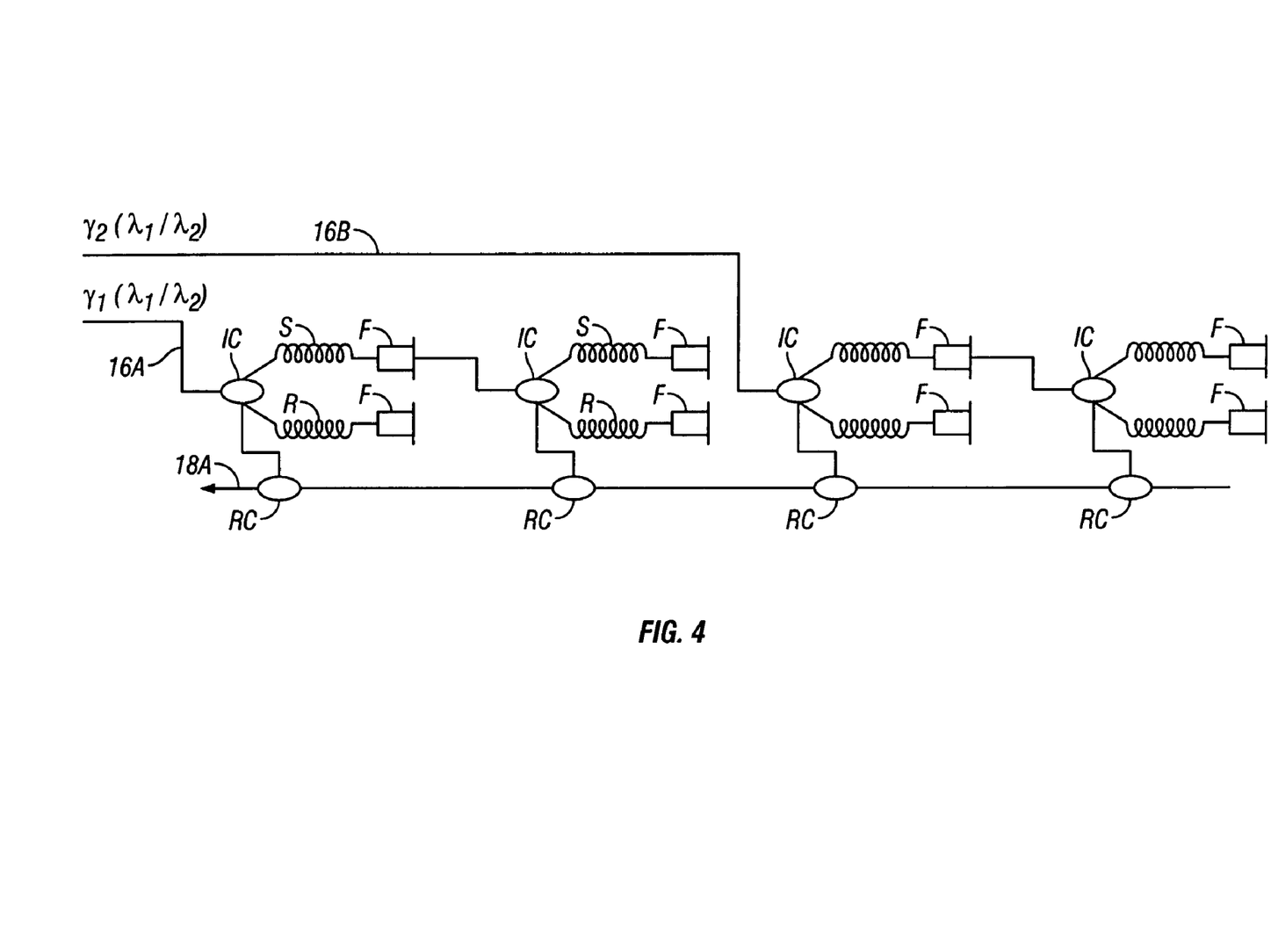
FIG. 4 shows one embodiment of a combined FDM/WDM telemetry optical sensor system.

An example embodiment of a sensor system using the combined frequency division multiples/wavelength division multiplex telemetry is shown in FIG. 4. Light from the source (10 in FIG. 3, having been modulated at a plurality of different carrier frequencies, is transmitted along an input line 16A, 16B for each frequency $\gamma_1$, $\gamma_2$, respectively. The sensor sub arrays, including input couplers IC, sensors S, wavelength selective Faraday rotator mirrors F, references R, and return couplers R, may be made substantially as explained above with reference to FIG. 1. Light returned on one return line will consist of multiple modulation frequencies, as shown at 18A in FIG. 4.

Figure 5:
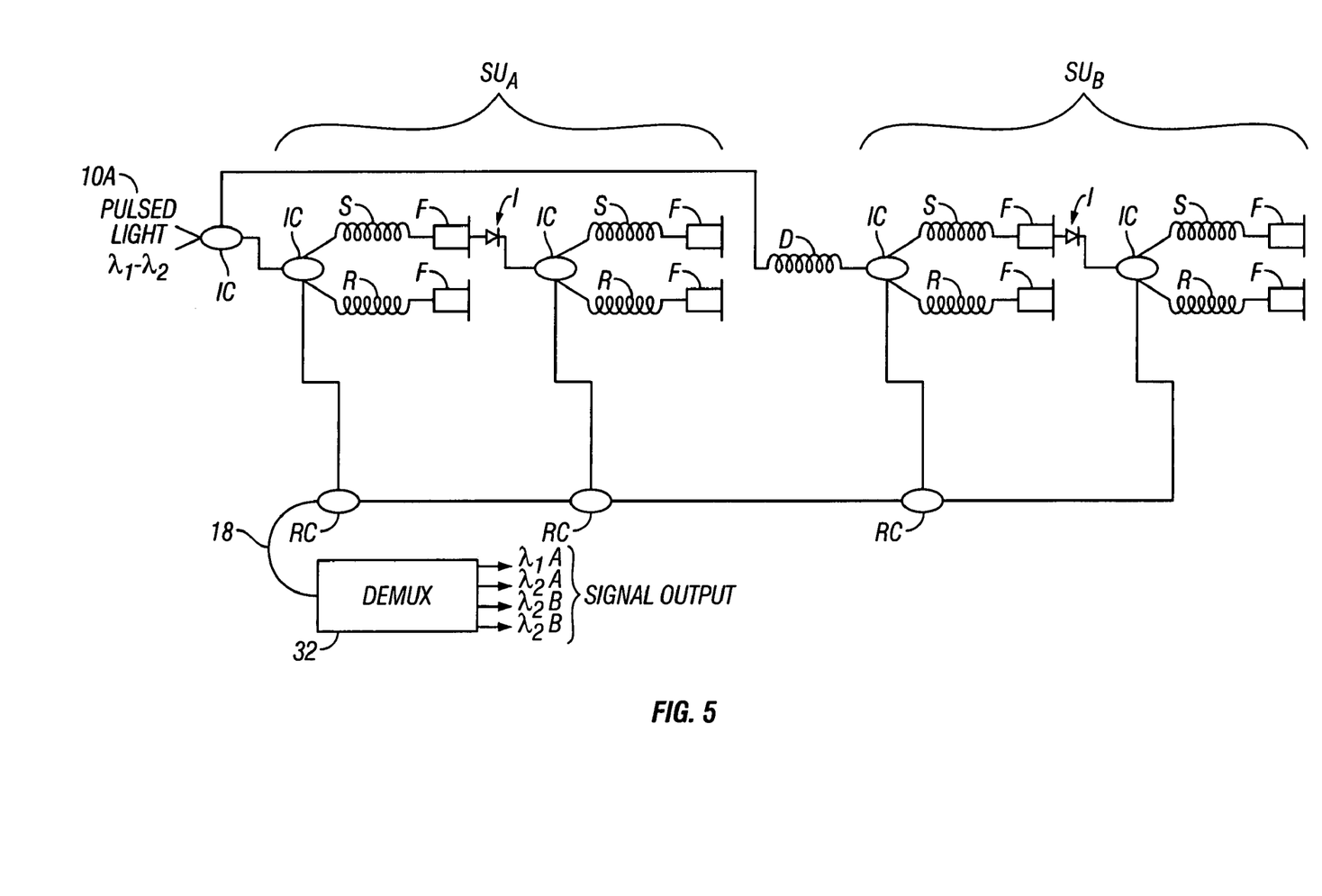
FIG. 5 shows one embodiment of a combined WDM/TDM telemetry optical sensor system.

Another implementation uses wavelength division multiplex (WDM) telemetry combined with time division multiplex telemetry (TDM). An example of such implementation is shown in FIG. 5. A light source 10A includes a modulator (not shown separately) to cause the source 10A to emit pulses of light at a selected pulse rate and pulse width. The source 10A includes a plurality of optical wavelengths, shown as only two wavelengths ($\lambda_1$ and $\lambda_2$) for simplicity of the illustration. The system includes two sensor units, $SU_A$ and $SU_B$, each of which includes input couplers IC, sensors S, reference coils R, wavelength selective reflectors F and return couplers RC. The sensing units $SU_A$ and $SU_B$ may be made substantially as explained with reference to FIG. 1 in order that a plurality of light wavelengths may be multiplexed along a single light input line 16 and returned on a single line 18. The pulse of light on input line 16 reaches $SU_A$ and is delayed in time before it reaches $SU_B$ by using a delay line D which may be formed from a length of optical fiber. On return line 18, light from $S_B$ will be delayed by a selected amount of time before reaching the second sensor unit $SU_A$ The return light may be demultiplexed in a demultiplexer 32 that is time-referenced to the source 10A such that signals from each sensor unit $SU_A$ and $SU_B$ can be separated. Individual sensor signals are thus identified with respect to the sensor unit (based on the time delay) and on the individual wavelength as shown in FIG. 5.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical fiber sensor array, comprising:
   a first sensor fiber and a first reference fiber each coupled at one end thereof to one side of a first optical coupling;
   a wavelength selective reflector operative at a first wavelength coupled to the other end of each of the first sensor fiber and the first reference fiber;
   a second sensor fiber coupled at one end to one side of a second optical coupling, the other side of the second optical coupling coupled to an opposite side of one of the first wavelength selective reflectors coupled on one side to the first sensor fiber and the first reference fiber; and
   a wavelength selective reflector operative at a second wavelength coupled to the other end of each of the second sensor fiber and the second reference fiber, the second wavelength selective reflectors operative at a wavelength different from the operative wavelength of the first wavelength selective reflectors.

2. The array of claim 1 wherein the first and the second optical couplings each form an optical interferometer with respect to the first and second sensor fibers and reference fibers.

3. The array of claim 1 further comprising a signal return line coupled to the one side of the first optical coupling and coupled to the one side of the second optical coupling.

4. The array of claim 1 further comprising an optical isolator interposed between the other side of the second optical coupling and the one of the first wavelength selective reflectors optically coupled to the second optical coupling.

5. The array of claim 1 further comprising a multiple wavelength light source coupled to the other side of the first optical coupling.

6. The array of claim 1 further comprising a frequency modulator operatively coupled to the light source to enable frequency division multiplexing of signals.

7. The array of claim 1 further comprising a plurality of additional sensors, each additional sensor comprising a sensor fiber, a reference fiber, an optical coupling and a wavelength selective reflector coupled to one end of each sensor fiber and reference fiber, the wavelength selective reflectors for each additional sensor operative at a different wavelength from the operative wavelength of the other sensors in the array.

8. The array of claim 7 wherein the plurality of additional sensors is divided into a plurality of sensor groups, each group including at least two of the sensors, at least two of the groups coupled to each other through an optical delay line, the array further comprising a modulator coupled to the light source, the modulator adapted to pulse the light source to enable time division multiplex signal detection from each of the at least two sensor groups.

9. The array of claim 1 further comprising a polarization beam splitter interposed between a light source and the other side of the first optical coupling.

10. The array of claim 1 wherein the first reference fiber comprises a sensing fiber having an operating light path in the opposite direction to an operating light path in the first sensor fiber.

11. The array of claim 1 wherein at least one of the first and second wavelength selective reflectors comprises a Bragg grating.

12. The array of claim 1 wherein at least one of the first and second wavelength selective reflectors comprises a wavelength selective mirror.

13. The array of claim 1 wherein the first and second wavelength selective reflectors comprise Faraday rotator mirrors.

14. A marine seismic sensor system, comprising:
    a seismic vessel adapted to tow at least one streamer; and
    at least one seismic streamer coupled to the vessel, the at least one streamer including at least one sensor array thereon, the at least one sensor array comprising a first sensor fiber and a first reference fiber coupled at one end thereof to one side of a first optical coupling, a wavelength selective reflector operative at a first wavelength coupled to the other end of each of the first sensor fiber and the first reference fiber, a second sensor fiber and a second reference fiber each coupled at one end to one side of a second optical coupling, the other side of the second optical coupling coupled to an opposite side of one of the first wavelength selective reflectors coupled on one side to the first sensor fiber and the first reference fiber, and a wavelength selective reflector operative at a second wavelength coupled to the other end of each of the second sensor fiber and the second reference fiber, the second wavelength selective reflectors operative at a wavelength different from the operative wavelength of the first wavelength selective reflectors.

15. The system of claim 14 wherein the first and the second optical couplings each form an optical interferometer with respect to the first and second sensor fibers and reference fibers.

16. The system of claim 14 further comprising a signal return line coupled to the one side of the first optical coupling and coupled to the one side of the second optical coupling.

17. The system of claim 14 further comprising an optical isolator interposed between the other side of the second optical coupling and the one of the first wavelength selective reflectors optically coupled to the second optical coupling.

18. The system of claim 14 further comprising a multiple wavelength light source coupled to the other side of the first optical coupling.

19. The system of claim 14 further comprising a frequency modulator operatively coupled to the light source to enable frequency division multiplexing of signals.

20. The system of claim 14 further comprising a plurality of additional sensors, each additional sensor comprising a sensor fiber, a reference fiber, an optical coupling and a wavelength selective reflector coupled to one end of each sensor fiber and reference fiber, the wavelength selective reflectors for each additional sensor operative at a different wavelength from the operative wavelength of the other sensors in the array.

21. The system of claim 20 wherein the plurality of additional sensors is divided into a plurality of sensor groups, each group including at least two of the sensors, at least two of the groups coupled to each other through an optical delay line, the array further comprising a modulator coupled to the light source, the modulator adapted to pulse the light source to enable time division multiplex signal detection from each of the at least two sensor groups.

22. The system of claim 14 further comprising a polarization beam splitter interposed between a light source and the other side of the first optical coupling.

23. The system of claim 14 wherein the first reference fiber comprises a sensing fiber having an operating light path in the opposite direction to an operating light path in the first sensor fiber.

24. The system of claim 14 wherein at least one of the first and second wavelength selective reflectors comprises a Bragg grating.

25. The system of claim 14 wherein at least one of the first and second wavelength selective reflectors comprises a wavelength selective mirror.

26. The system of claim 14 wherein the first and second wavelength selective reflectors comprise Faraday rotator mirrors.

27. An optical sensor array, comprising:
a first optical sensor including a first sensing fiber and a first wavelength selective reflector at one end of the first sensing fiber, the other end of the first sensing fiber coupled to an optical signal line; and
a second optical sensor including a second sensing fiber and a second wavelength selective reflector at one end of the second sensing fiber, the other end of the second sensing fiber coupled to the optical signal line, the first and second wavelength selective reflectors operative at different light wavelengths from each other.

28. The array of claim 27 wherein each of the first and second optical sensors comprises a reference fiber, each reference fiber and each of the first and second sensing fibers respectively coupled to a first and a second interferometer.

29. The array of claim 27 wherein at least one of the first and second wavelength selective reflectors comprises a Bragg grating.

30. The array of claim 27 wherein at least one of the first and second wavelength selective reflectors comprises a wavelength selective mirror.

31. The array of claim 27 further comprising a signal return line coupled to one side of the first optical sensor and coupled to one side of the second optical sensor.

32. The array of claim 27 further comprising an optical isolator interposed between the first optical sensor and the second optical sensor, the first and second optical sensors coupled in series along the optical signal line.

33. The array of claim 27 further comprising a frequency modulator operatively coupled to the light source to enable frequency division multiplexing of signals.

34. The array of claim 27 further comprising a plurality of additional sensors, each additional sensor comprising a sensor fiber, a reference fiber, an optical coupling and a wavelength selective reflector coupled to one end of each sensor fiber and reference fiber, the wavelength selective reflectors for each additional sensor operative at a different wavelength from the operative wavelength of the other sensors in the array.

35. The array of claim 34 wherein the plurality of additional sensors is divided into a plurality of sensor groups, each group including at least two of the sensors, at least two of the groups coupled to each other through an optical delay line, the array further comprising a modulator coupled to the light source, the modulator adapted to pulse the light source to enable time division multiplex signal detection from each of the at least two sensor groups.

36. The array of claim 27 further comprising a polarization beam splitter interposed between a light source and the other side of the first optical coupling.

37. The array of claim 27 wherein the first reference fiber comprises a sensing fiber having an operating light path in the opposite direction to an operating light path in the first sensor fiber.

38. The array of claim 27 wherein each of the first and second wavelength selective reflectors comprises a Bragg grating.

39. The array of claim 27 wherein each of the first and second wavelength selective reflectors comprises a wavelength selective mirror.

40. The array of claim 27 wherein the first and second wavelength selective reflectors comprise Faraday rotator mirrors.

* * * * *